UNITED STATES PATENT OFFICE.

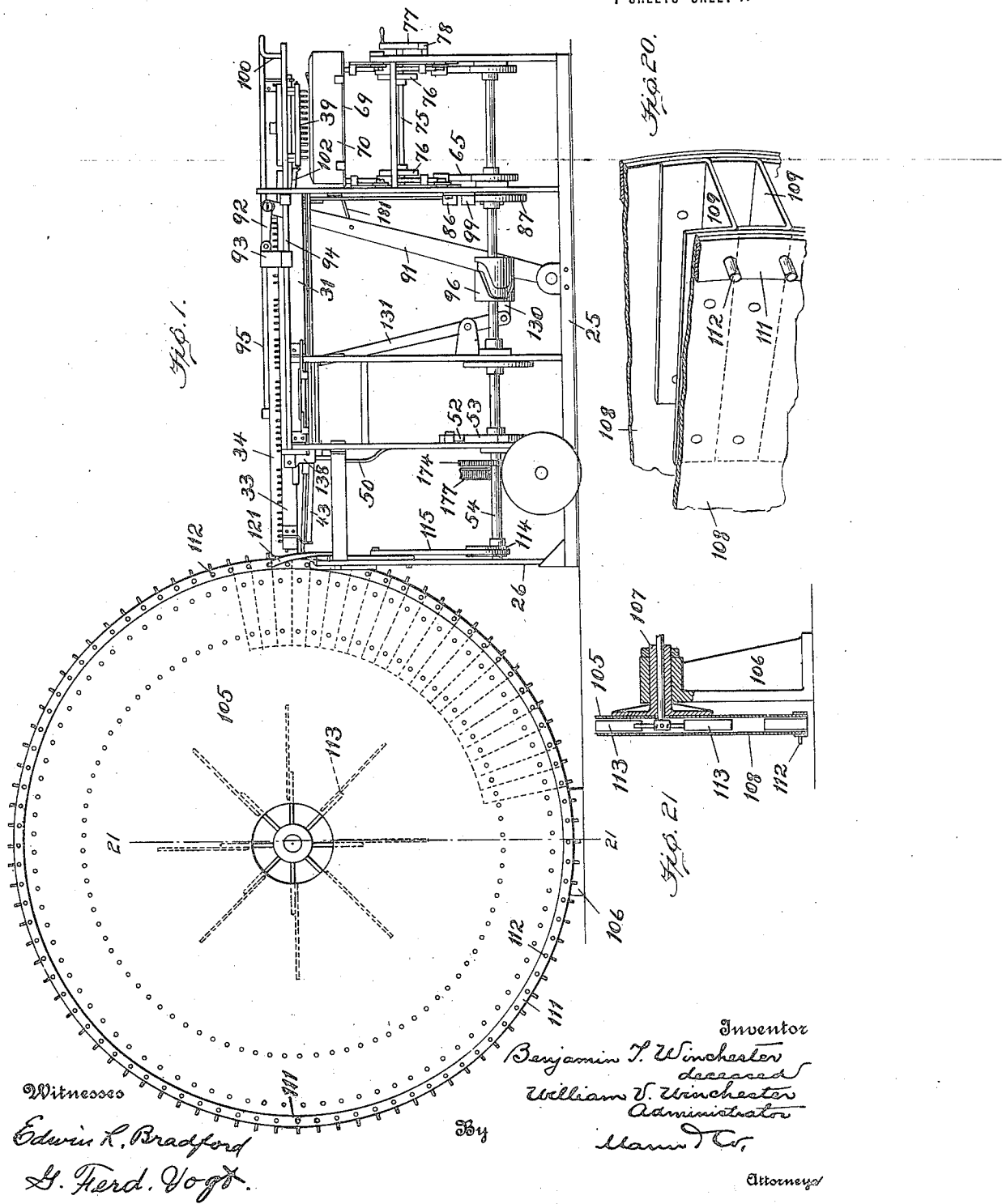

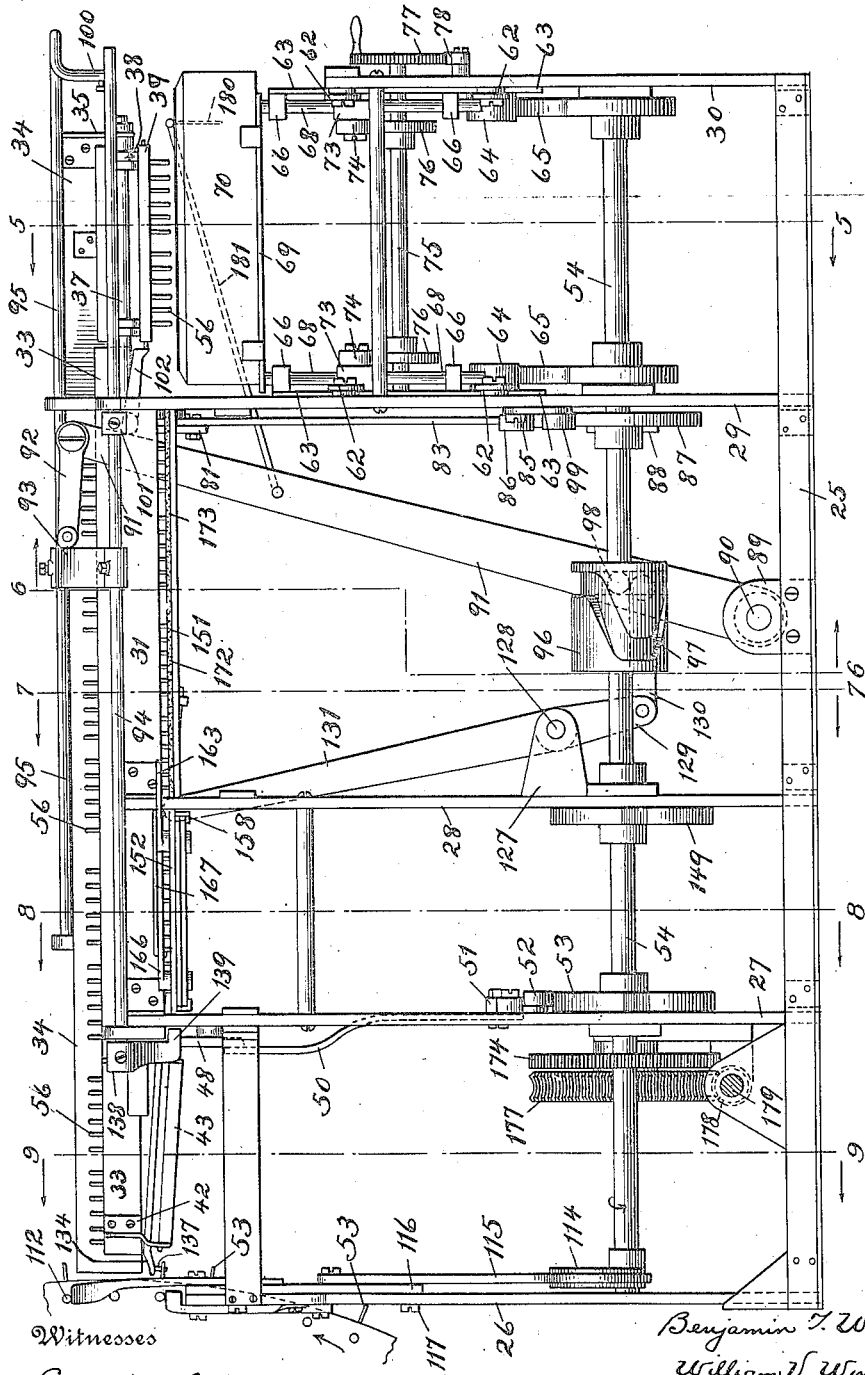

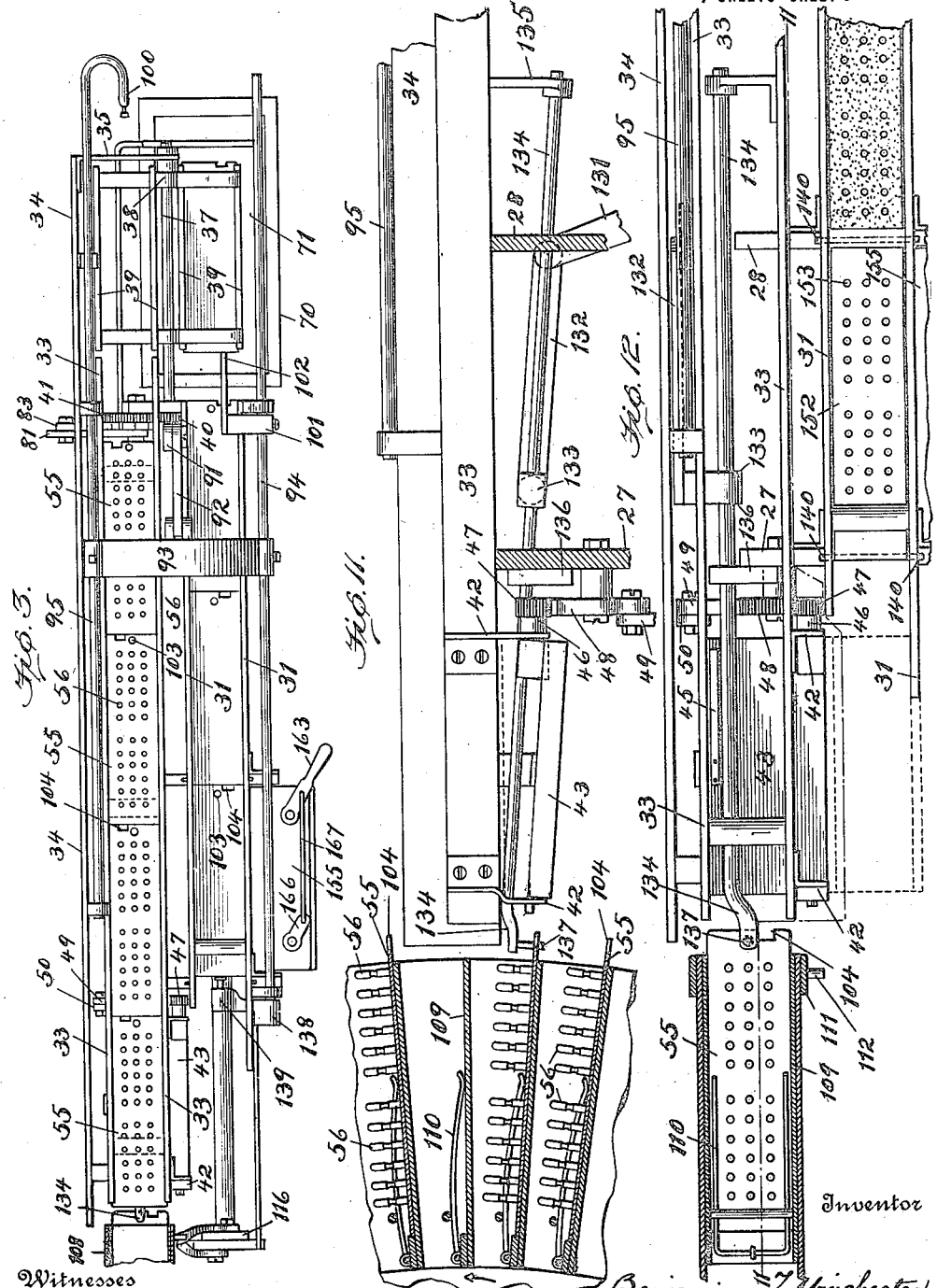

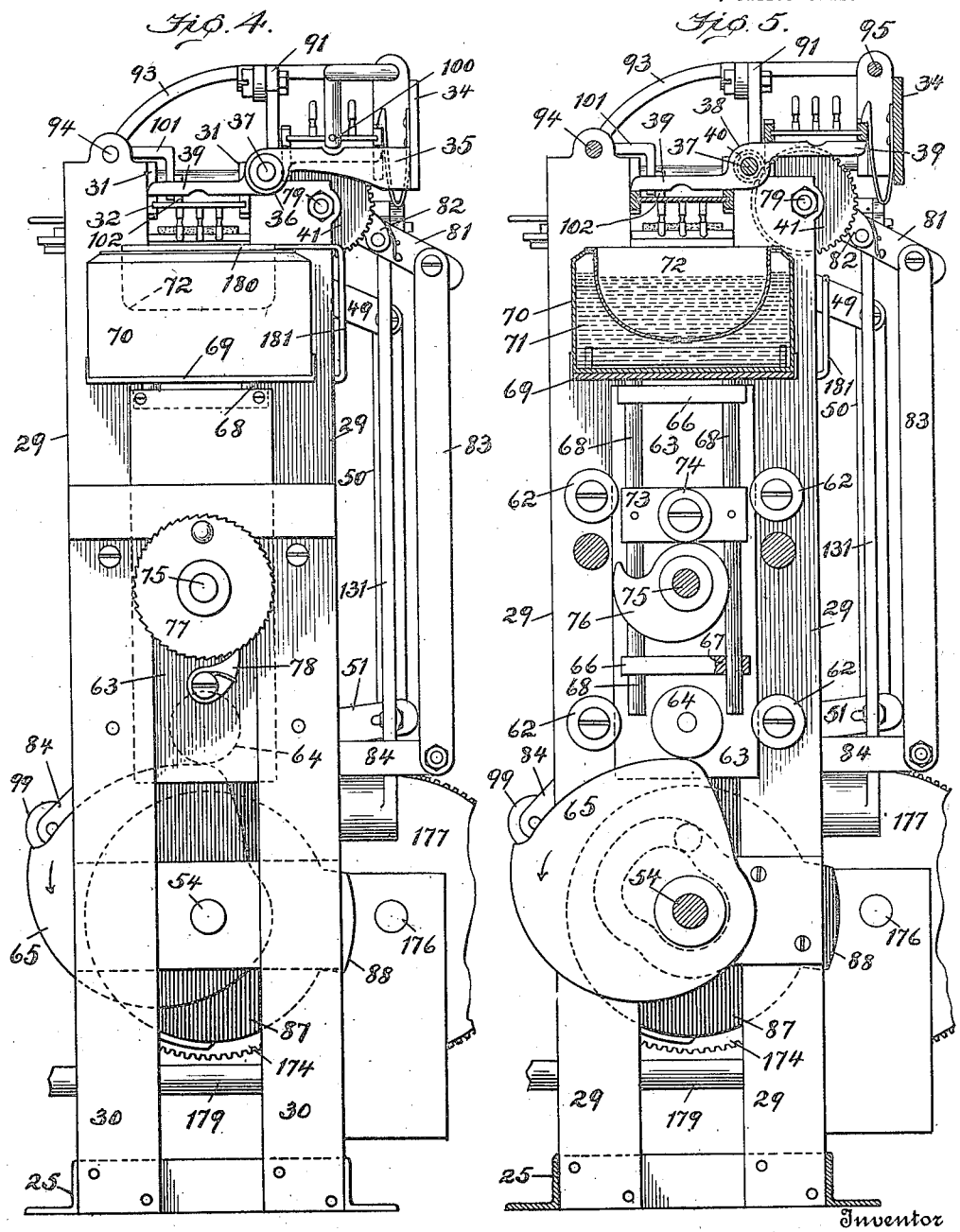

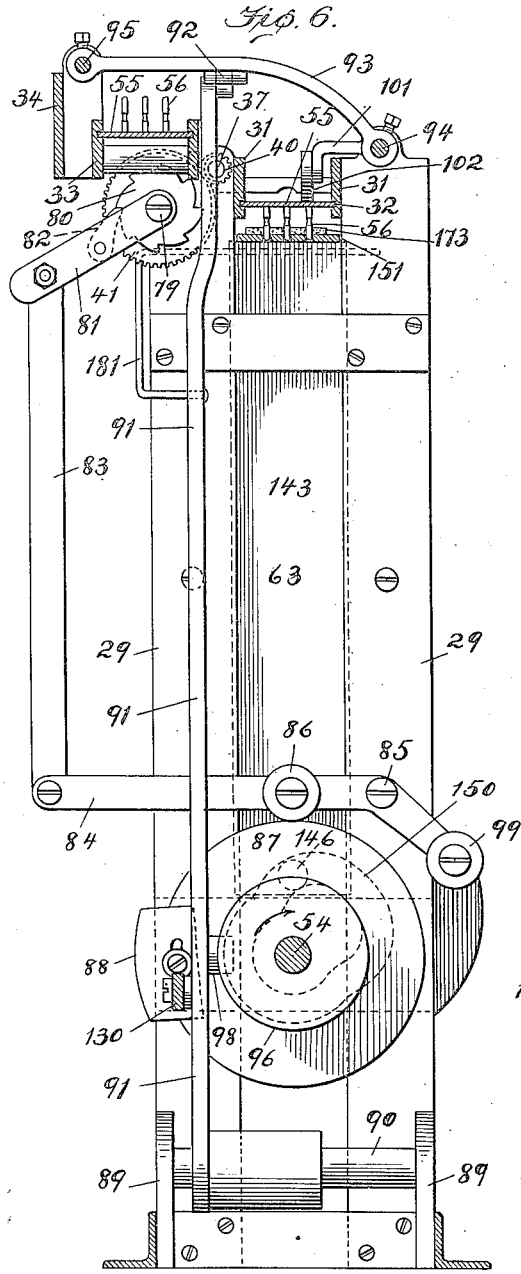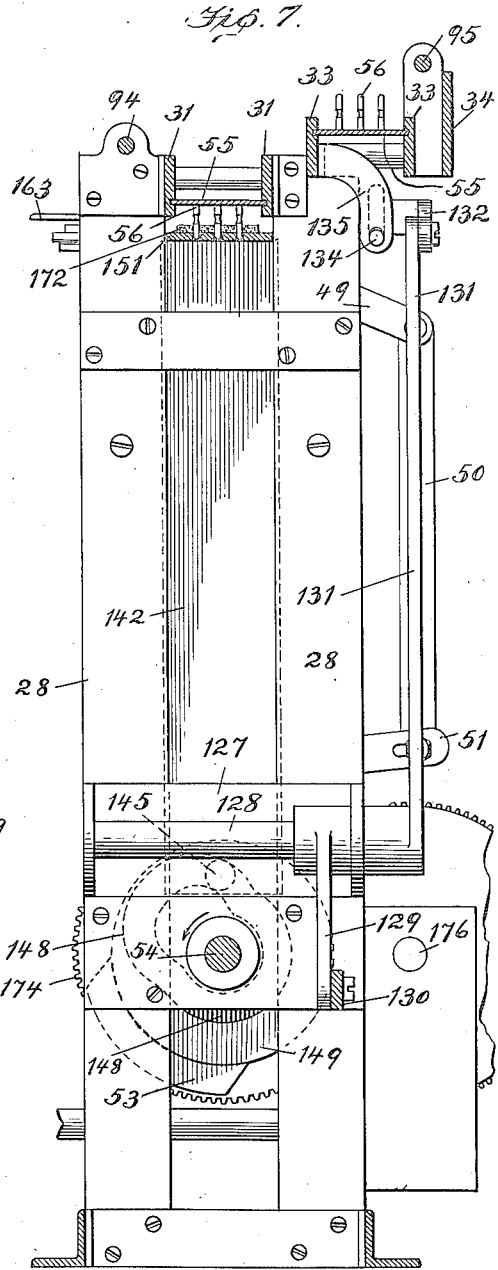

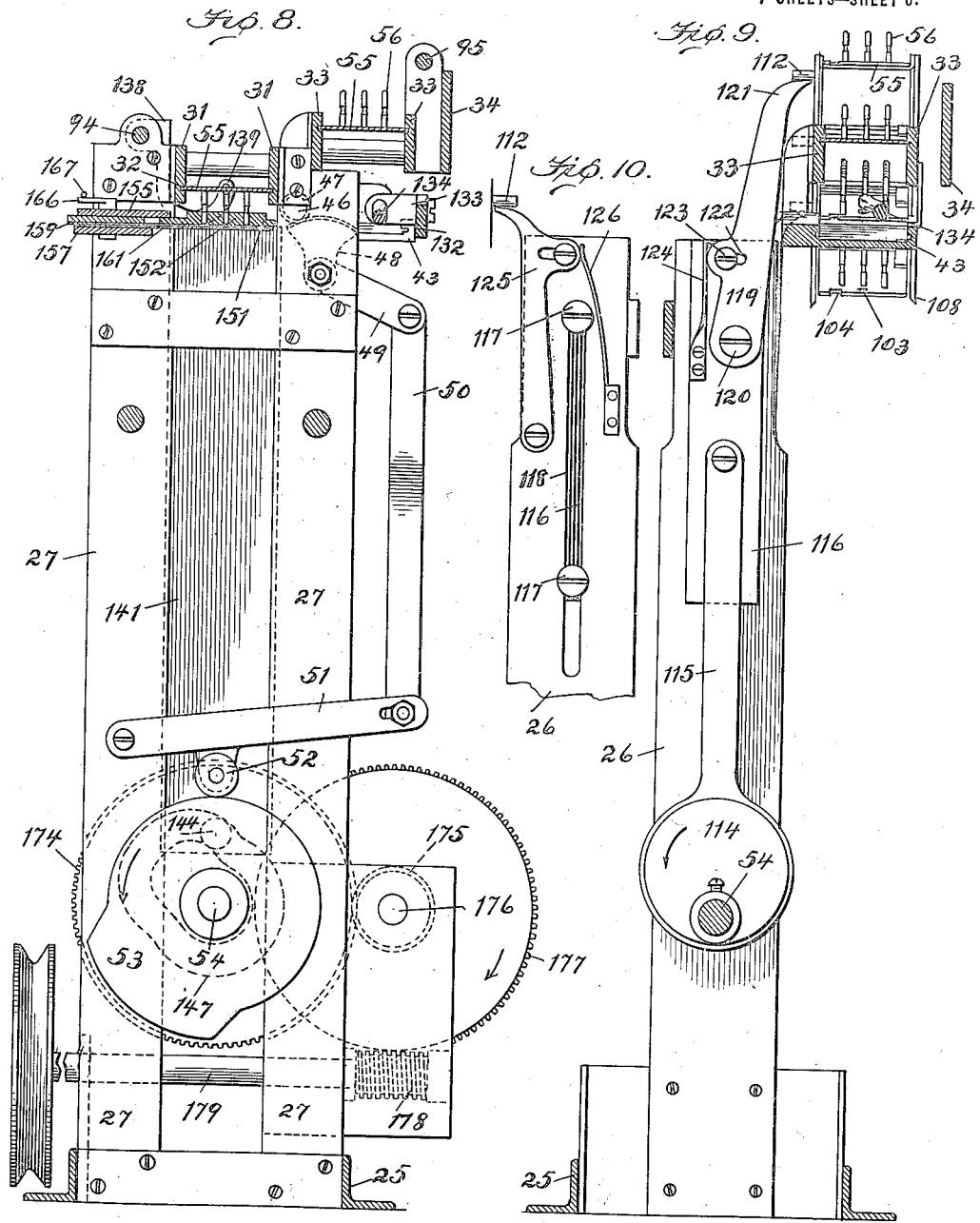

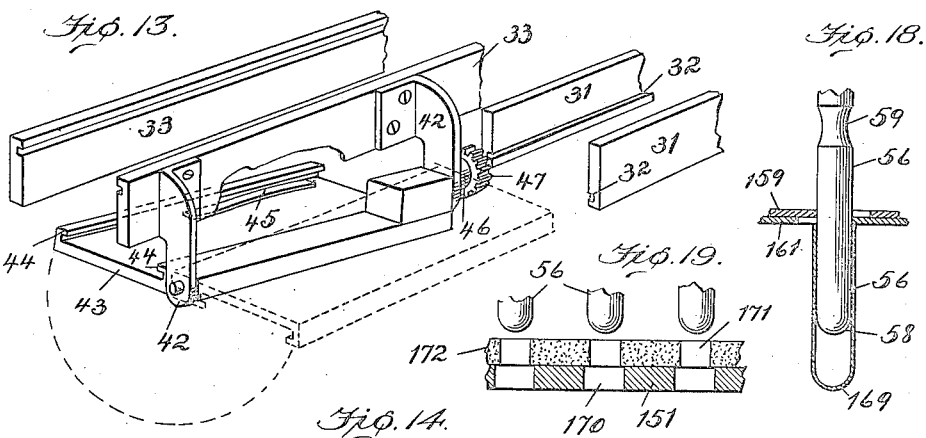
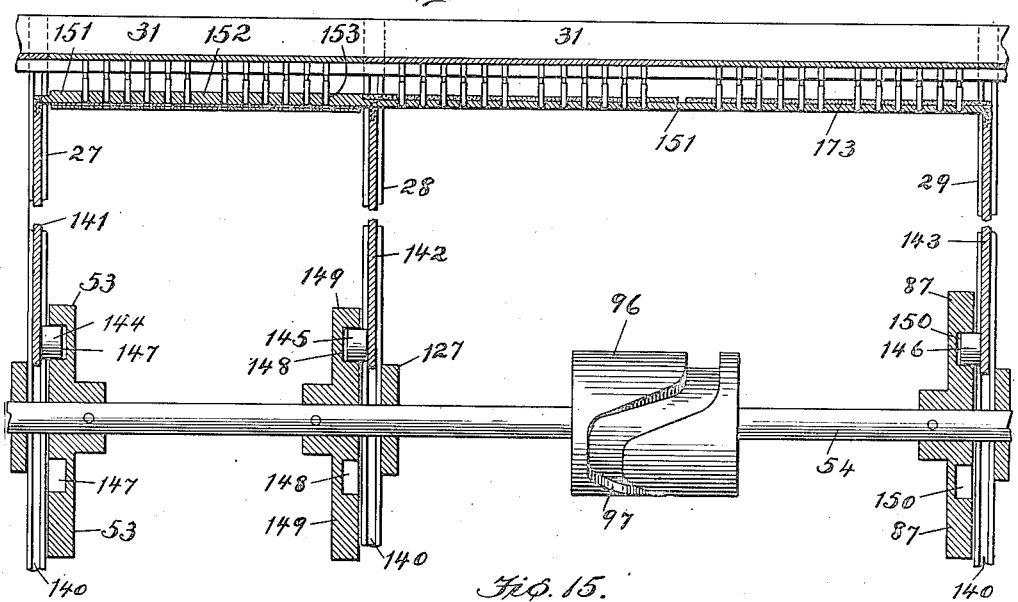
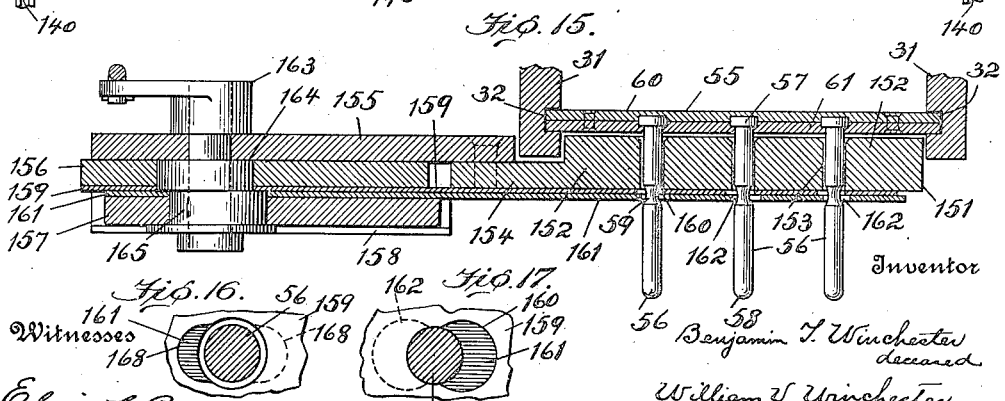

BENJAMIN T. WINCHESTER, DECEASED, LATE OF WINDSOR HILLS, MARYLAND, BY WILLIAM V. WINCHESTER, ADMINISTRATOR, OF WINDSOR HILLS, MARYLAND, ASSIGNOR TO SHARP & DOHME, A CORPORATION OF MARYLAND.

CAPSULE-MACHINE.

1,146,539.  Specification of Letters Patent.  Patented July 13, 1915.

Application filed December 12, 1913.  Serial No. 806,219.

*To all whom it may concern:*

Be it known that BENJAMIN T. WINCHESTER, deceased, late a citizen of the United States, residing at Windsor Hills, in the county of Baltimore and State of Maryland, did invent certain new and useful Improvements in Capsule-Machines, of which the following is a specification.

This invention relates to a machine for making gelatin capsules.

One object of the invention is to provide an improved construction of capsule machine for carrying out the various steps in the formation, hardening and stripping of the capsule parts in an expeditious manner.

Another object is to provide an improved construction of machine wherein a number of peg or mold plates may be circulated through the machine by improved means so that ample time will be given in which to effect a setting and hardening of the capsule parts; the stripping of the capsule parts from the peg or mold pins and to also provide for the proper care of the pegs or mold pins, such as cleaning the same before again coating them with gelatin.

In carrying out the invention the machine first effects a coating of the pegs with gelatin; the pegs are then turned up-side-down so as to allow the surplus gelatin to drain toward the open end of the capsule coating; the plates with the coated pegs thereon are then deposited in a container where they may be retained for a period in a current of air so as to effect a hardening; the peg plates and coated pegs thereon are then withdrawn from the container and presented to a stripping mechanism which strips the hardened capsule parts from the pegs and the plates are then presented to mechanism which cleans, and then if desired greases the pegs to put them in condition for another coating.

With these and other objects in view the invention is illustrated in the accompanying drawings, wherein,—

Figure 1, shows a side elevation of the complete machine. Fig. 2, illustrates, on an enlarged scale, one end of the machine in side view. Fig. 3, shows the same in top plan view. Fig. 4, illustrates the machine in end elevation. Fig. 5, shows the machine in vertical cross-section,—the section being taken on the line 5—5 of Fig. 2. Fig. 6, illustrates the same in cross-section, which latter is taken on the line 6—6 of Fig. 2. Fig. 7, shows a similar view,—the section however being taken on the line 7—7 of Fig. 2. Fig. 8, also illustrates a cross-sectional view through the machine,—this section being taken on the line 8—8 of Fig. 2. Fig. 9, shows another cross-section through the machine as viewed on the line 9—9 of Fig. 2. Fig. 10, shows an enlarged end elevation of the left-hand end of the structure shown in Fig. 2. Fig. 11, shows a sectional elevation of the extractor mechanism which withdraws the peg plates containing the capsules from the rotary peg-plate container and also shows in side elevation the mechanism for reversing the peg-plates after the latter have been extracted. Fig. 12, illustrates the same in plan view. Fig. 13, shows the peg-plate reversing mechanism in perspective. Fig. 14, shows a vertical longitudinal section through the stripper and cleaning mechanism and the devices which operate the same. Fig. 15, illustrates an enlarged vertical sectional detail through the stripper mechanism. Figs. 16 and 17 are details illustrative of the operation of the stripper plates. Fig. 18, shows a detail of the stripper during the operation of removing the capsule part from the peg. Fig. 19, illustrates a portion of the cleaning device to receive the bare pegs after the capsule parts have been removed to clean the same and make them ready for coating. Fig. 20, shows an enlarged perspective detail of a portion of the rotary peg-plate carrier, and Fig. 21, illustrates on a small scale, a sectional detail through the peg-plate carrier and the air circulating device therein,—the section being taken on the line 21—21 of Fig. 1.

Referring to the drawings the numeral, 25, designates the base from which suitable bars, 26; 27—27; 28—28; 29—29, and 30—30, extend vertically therefrom. At their upper ends, bars, 27, 28, and, 29, sustain two spaced-apart horizontal guide plates, 31, each of which has a horizontal guide groove, 32, in its vertical face so that said grooves will extend parallel and in the same plane and form a guide-way which extends to the upper ends of said bars, 27, 28, and, 29, and which will hereinafter be referred to as the return guide-way. Another guideway is provided at one side of the said return guideway and is formed by parallel guide plates, 33, which are sustained by any suitable means so as to extend parallel with the return guideway. It will be noted by reference to Figs. 2, 3 and 13 of the drawing, that the return guideway is shorter than the other guideway,—the latter extends beyond both ends of said return guideway and will hereinafter be referred to as the outgoing guideway so as to distinguish from the return guideway. A horizontal bar, 34, is rigidly sustained at the outer side of the outgoing guideway and said bar is longer than said latter guideway, for purposes which will presently be explained.

At the front end, the bar, 34, carries a bearing bracket, 35, as clearly shown in Figs. 2, 3 and 4 of the drawing, and this bearing bracket projects horizontally in front and crosswise of the outgoing guideway and has a bearing eye, 36, at its end. A horizontal shaft, 37, has one end sustained in the eye, 36, of bracket, 35, and its other end projects through a bearing, 37, at the upper end of one of the vertical bars, 29, so as to pivotally sustain said shaft in a horizontal plane. This horizontal shaft, 37, also has position in a vertical plane between the two guideways, as shown in Figs. 3, 4 and 5 of the drawings, and said shaft is provided with a turnover frame, 38. This turnover frame is provided with two short guide sections, 39, which are so positioned that one guide section will have position at one side of the shaft, 37, while the other will have position at the opposite side of said shaft. By means of this construction one guide section will be in a position where it will be in alinement with the outgoing guideway while the other guide section will at the same time have position in alinement with the return guideway. The inner end of the turnover shaft, 37, is provided with a pinion, 40, which is in mesh with a gear wheel, 41, so that at a predetermined period in the cycle of the machine the turnover shaft may be partially rotated to reverse the positions of the two guide sections, 39, and turn that one which had been in alinement with the outgoing guideway to a position in alinement with the return guideway and at the same time turn the other section from alinement with the return guideway so it will register with the outgoing guideway. The purpose of this and the means for actuating the gear wheel, 41, to turn the guide sections over will presently be explained.

At the opposite end of the two guideways the machine is provided with two bracket bearings, 42, which are secured to and depend from that one of the guide plates, 33, which is next to the return guideway, as shown in perspective in Fig. 13, of the drawing. One of these bracket bearings is longer than the other and the two bearings sustain a turnover plate, 43. This turnover plate has grooved ribs, 44, at its opposite longitudinal side edges and one surface of said plate is provided with a slightly-curved plate spring, 45, shown in Figs. 12 and 13, of the drawings. By referring to Fig. 13, it will be seen that the turnover plate, 43, is so mounted in the bracket bearings, 42, that it may be turned so as to have position beneath the inner end of the outgoing guideway or swung on its pivots through the arc shown in broken lines in Fig. 13, and completely turned over so as to assume a horizontal position at the inner end of the return guideway. When in this latter position, as shown in broken lines in Fig. 13, the grooved ribs, 44, will project downwardly but the grooves thereof will have position in alinement with the grooves, 32, in the guide plates, 31, of the return guideway.

By referring particularly to Figs. 8, 11, 12 and 13 of the drawings, it will be noted that one end of the turnover plate, 43, is provided with a short or stub shaft, 46, on which a pinion, 47, is rigidly secured. Below the pinion, 47, and pivotally secured to one of the vertical bars, 27, is a segment rack, 48, which meshes with the pinion, 47, and which is rocked by a link, 49, carried at the upper end of vertical bar, 50. The lower end of vertical bar, 50, is pivotally attached to the free end of rock-bar, 51, which latter has a roller, 52, that rides on a cam, 53, on a horizontal main shaft, 54, so that when the high portion of said cam passes under the roller, 52, the segment rack, 48, will be actuated in one direction and the turnover plate, 43, will be swung from beneath the outgoing guideway to a position coincident with the end of the return guideway.

From the foregoing explanation it is to be understood that the machine has two parallel side-by-side guideways; that at one end of said guideways a turnover frame is pivotally mounted which frame has two guide sections,—one section registering with one guideway while the other section is in register with the other guideway; that at predetermined intervals this guide frame and its guide sections are given a partial rotation to reverse the positions of the guide sections with respect to the two guideways; that at the other end of the guideways a turnover plate is pivotally mounted and so connected with a cam on the main shaft, that at one period in the operation the turnover plate will have position below the outgoing guideway while at another period it will be rotated and reversed to swing into alinement with the return guideway.

The object of the guideways and the turnover at one end thereof is to accommodate a series of peg plates, 55, or plates having a plurality of what might be termed mold-pins or pegs, 56, attached thereto. The precise construction of these peg-plates and the particular manner of securing the pegs thereto is not essential to the present invention, but the same is best shown in Figs. 15, 16, 17 and 18 of the drawing wherein it will be seen that the pegs, 56, are provided with annular enlargements or shoulders, 57, at one end while at the other end, 58, said pegs are rounded and closed. Between the ends the bodies of the pegs have contracted or reduced portions, 59, for a purpose presently to be explained. The peg plates are formed preferably of two flat plates, 60, and, 61, respectively which have confronting sockets or recesses to receive the enlarged ends of the pegs and said two plates are riveted together to retain the pegs in place.

The pegs, 56, are the molds on which the capsule parts are to be formed by coating the same with gelatin while the latter is in a fluid state through the action of heat. It is desirable, in view of the fact that capsules comprise a larger and a smaller part which are telescoped to form a complete capsule container, that an equal number of larger and smaller capsule parts be formed at the same time. To do this each plate is preferably provided with an equal number of larger and smaller pegs,—that is, larger and smaller in diameter. The larger pegs thus forming the female capsule parts and the smaller pegs the male capsule parts so that an equal number of male and female parts are formed on one peg plate.

To coat the pegs the latter are preferably dipped into a container in which gelatin in a fluid state is maintained,—the pegs upon dipping into the gelatin receiving the coating. The mechanism for effecting this coating or dipping of the pegs will now be explained, reference being made to Figs. 2, 3, 4, 5 and 6 of the drawings.

The confronting vertical sides of the upright bars 29—29 and 30—30, are each provided with a plurality of grooved rollers, 62,—two rollers being shown in vertical alinement, in the present instance, on each of said bars. The arrangement of these rollers on the two sets of bars is such as to permit a vertical elevator plate, 63, to have position between them with the opposite side edges of the plates engaged by the rollers to retain them in a vertical position. Near the lower end each elevator plate, 63, has a roller, 64, which latter seats on cams, 65, that are carried on the main horizontal shaft, 54. Obviously, when the cams, 65, turn with the shaft, 54, they will act on the rollers, 64, and raise and lower the latter according to the shape of the cams. When rollers, 64, are thus moved vertically by the cams, 65, they will impart a like vertical movement to the two elevator plates, 63.

The two elevator plates each have a plurality of horizontal batten-like bars, 66, rigidly secured across their confronting vertical faces, as seen best in Figs. 2 and 5 and these bars each have vertical passages, 67, therethrough (one of which is shown in the lower bar, 66, in Fig. 5) for the free passage of vertical rods, 68. In the present instance two vertical rods, 68, pass vertically through each bar, 66, and at the side of each elevator plate, 63. The upper ends of the vertical rods, 68, sustain a horizontal table, 69, which latter carries a receptacle, 70, having two compartments, 71, and, 72, respectively. The compartment, 71, of this receptacle is utilized to carry hot water while the compartment, 72, is to contain the gelatin in a fluid state.

From the foregoing explanation it is believed to be clear that cams, 65, will cause the elevator plates, 63, to rise and fall and to impart a like movement to the receptacle, 70. This vertical movement therefore of the receptacle, 70, takes place directly beneath one section, 39, of the turnover frame and directly in front of the return guideway, so as to present the fluid gelatin to the depending pegs on the particular pegplate that is at that time sustained by the turnover section, 39. This constant dipping of the pegs into the gelatin obviously carries off so much gelatin as the pegs will retain and unless some means be provided to vary the upward limit of movement of the gelatin container a frequent replenishing of the gelatin would be necessary. The varying of the upward stroke of the gelatin container is also desirable because to coat the entire exposed length of the pegs when a capsule of perhaps half the length of the pegs is desired, would only utilize gelatin unnecessarily and this should be avoided.

To vary the movement of the gelatin container is one of the reasons why the rods, 68, are utilized to carry table, 69, instead of having the elevator plates, 63, directly sustain the container.

By referring particularly to Figs. 2, 4 and 5 it will be seen that a cross plate, 73, connects the two rods, 68, and that a roller, 74, is carried by said plate. It will also be seen that a shaft, 75, extends horizontally between and is sustained by the two elevator plates, 63. This shaft, 75, raises and lowers with the elevator plates and is provided with two cams, 76,—one cam having position on the shaft, 75, so as to act on one roller, 74, while the other cam acts on the roller, 74, of the other elevator plate. It will therefore be seen that if the shaft, 75, is rotated the cams, 76, will act on rollers, 74, and move the plate, 73, and rods, 68, in a vertical direction independently of the elevator plates. Therefore, if the cams are moved to elevate the rods with respect to the elevator plates upon the next upward stroke of the elevator plate the table, 69, will be moved higher than on the last stroke of the elevator plates. This variation in the upward limit of movement of the gelatin container is to be effected by slight degree at a time, by simply turning the ratchet wheel, 77, on the outer end of the shaft, 75,—a pawl, 78, holding the ratchet wheel in the adjusted position.

It has heretofore been explained that turnover shaft, 37, is periodically given a partial rotation by means of a pinion 40, and a gear, 41, which meshes with said pinion. The means for actuating the gear, 41, will therefore now be explained in connection with Figs. 2, 4, 5 and 6 of the drawings.

One of the vertical bars, 29, sustains a short horizontal stub shaft, 79, at its upper end and it is on this shaft that gear, 41, is mounted. At the side of gear, 41, and also on said shaft, 79, there is a ratchet wheel, 80, which is rigid with respect to the said gear wheel (see Fig. 6). A lever, 81, is pivotally mounted on the stub shaft, 79, at the side of the ratchet wheel and said lever carries a pawl, 82, which engages the ratchet wheel. A long link, 83, connects the ratchet lever, 81, with a cam lever, 84, which latter is pivoted at, 85, to one of the vertical bars, 29, as shown in Fig. 6. This cam lever, 84, carries a roller, 86, which rides on the face of a cam, 87, that is mounted on the main shaft, 54, so that when block, 88, of the cam, 87, engages the roller it will throw the free end of the lever, 84, up, imparting a like motion to link, 83, and ratchet lever, 81, so as to turn the ratchet wheel one step at a time and thereby give the gear, 41, pinion, 40, and turnover shaft, 37, a partial rotation. Another roller, 99, is carried on the extreme end of cam lever, 84, so as to insure the return of said lever and roller, 86, after the block, 88, has actuated them. This partial rotation of the turnover shaft reverses the position of the two guide sections so that a peg plate which had position with its pegs pointing downwardly over the gelatin container will then be reversed so as to point the coated pegs upwardly and at the same time present said plate to the end of the outgoing guideway. After the peg plates with their coated pegs have been removed into alinement with the outgoing guideway they are then pushed from the guide section into the guideway by means which will now be explained, reference being made particularly to Figs. 2, 3, 4 and 6 of the drawings.

The base frame, 25, is provided with bearings, 89, which sustain a horizontal rock shaft, 90. This rock shaft carries a long lever, 91, which extends up through a space between the two guideways at the top of the machine and has a link, 92, at its upper end which connects the said lever with a cross-head, 93. At the top of the machine there are two horizontal rods, 94, and, 95, respectively which are slidably sustained in suitable bearings so as to be moved longitudinally with respect to the two guideways. These rods, 94, and, 95, are rigidly connected to the cross-head, 93, so that when the cross-head is moved by the rocking of lever, 91, the two rods, 94, and, 95, will be moved therewith.

Motion is imparted to the rock lever, 91, by means of a cam, 96, on the main shaft, 54, which cam has a groove, 97, in which a roller, 98, on the lever projects. When cam, 96, rocks lever, 91, and moves the horizontal rods, 94, and, 95, in a direction from the gelatin receptacle at one end of the guideways toward the turnover plate, 43, at the other end of said guideways, the rod, 95, is utilized to transfer the reversed peg plate from that guide section, 39, which is then holding said peg plate in alinement with the outgoing guideway. To do this, the rod, 95, has one end, 100, bent laterally and downwardly, as seen in Figs. 2, 3 and 4, so that said end will have position in a horizontal plane where it may engage the outer end edge of the peg plate and push said plate from the guide section, 39, of the turnover frame into the grooves of the outgoing guideway. When the rod, 95, pushes one peg plate into the outgoing guideway said plate will engage the plate in front of it and thereby advance any and all of the peg plates that may be in said outgoing guideway at that time.

By referring to Figs. 2 and 3 of the drawing, it will be seen that the rod, 94, carries an arm, 101, which extends over the guide plate, 31, and projects into the return guideway. This arm pivotally sustains a pawl, 102, whose end drags back through the return guideway and rides over the next peg plate that is to be pushed onto the turnover guide section, 39, which latter is in alinement with said return guideway.

By referring to Figs. 3, 11 and 12 of the drawings it will be noted that each peg plate, 55, has a perforation, 103, and also a notch, 104, at one end thereof. The notches, 104, are utilized to feed the plates in the return guideway by allowing the free end of the pawl, 102, to drop therein and thus engage the rear end of the peg plate next in front of it when the rod, 94, is moved to push the foremost plate onto the guide-section, 39, for dipping as shown in Fig. 3. The purpose of the perforations, 103, in the peg plates will presently be explained.

From the foregoing explanation it is believed to be understood that when the rods, 94, and, 95, are moved horizontally in one direction a peg plate with coated pegs will be transferred from the turnover frame into the outgoing guideway and all the previously coated pegs and plates carrying the same that are then in the outgoing guideway will be advanced in the latter guideway a distance equal to the throw of the rods, which is the length of one peg plate. While this is going on in the outgoing guideway, the other rod, 94, will be returning from the turnover frame (where it has left a plate for the pegs thereof to be dipped) and traveling back to the far end of the next peg plate to be in readiness to feed another plate forward when the return stroke of rod, 94, is made. After the pegs have been dipped, turned over, and pushed into the outgoing guideway, the latter will quickly become filled with plates whose coated pegs are turned up so the gelatin coating thereon may drain toward the base of the pegs before it sets. The plates with their coated pegs are then transferred from the outgoing guideway to a receiver, which retains them in proper atmospheric conditions to effect a hardening of the gelatin coating before removing the latter from the pegs. The receiver into which the plates are transferred and the means for effecting the transfer will therefore now be explained, particular reference being made to Figs. 1, 2, 3, 11, 12, 20 and 21, of the drawings.

Beyond the discharge end of the outgoing guideway there is provided a circular receptacle, 105, which is sustained by a suitable vertical support, 106, a detail of which on a small scale is shown in Fig. 21. This receptacle is carried on a rotary support, 107, and has spaced-apart circular walls, 108, with a series of radial partitions, 109, between said walls. These partitions are of such length as to accommodate one peg plate at a time, leaving the peg plate projecting slightly however, at the outer end. The projecting end of the peg plate is that end which has the perforation, 103, hereinbefore referred to. While the radial partitions form separate radial compartments, the compartments are nevertheless open at both ends. Each compartment of the receiver is provided with a spring clip arm, 110, which serves to clip the peg plates in place when they have been pushed therein. The compartments are arranged in a continuous series around the periphery of the circular receiver and one side wall, 108, of the receiver has a circular ring plate, 111, with a series of laterally-projecting pins or equivalent projections, 112, which are so disposed as to provide one pin for each compartment.

The central portion of the circular receiver is hollow and a rotary fan or blower, 113, is mounted so as to be revolved therein and to direct a blast of air radially through the annular series of compartments.

The position of the circular receiver with respect to the outgoing guideway is such that the open outer ends of the annular series of compartments may be turned in close proximity to the discharge end of said channel, as shown in Figs. 1, 2, 3, 11 and 12 of the drawings, and by means of devices which will presently be explained, said receiver may be turned so that the compartments may be made to aline successively with the discharge end of the outgoing guideway. By this means each time a peg plate is pushed into the outgoing guideway from the turnover frame at one end, another peg plate will be pushed from said outgoing guideway at the other end into that compartment of the circular receiver which at that time is in alinement with said guideway. When the peg plates are pushed one at a time into the receiver, the spring clip in the compartment receiving the plate will press on the same and hold it in place therein. After a plate has been pushed into a compartment the circular receiver is given a partial rotation to cause the filled compartment to move away from the outgoing guideway and to present an empty compartment in line with said guideway. The mechanism employed to effect this partial or step-by-step rotation of the receiver will now be explained, particular reference being made to Figs. 2, 9 and 10 of the drawings.

On the main shaft, 54, and at the inner side of vertical bar 26, there is an eccentric, 114, having a rod, 115, which extends upwardly therefrom with its upper end pivotally attached to a vertically-reciprocating plate, 116. This plate is located at the inner side of vertical bar, 26, and is held there by means of guide screws, 117, which pass through a vertical slot, 118, in the bar, 26, as shown in Fig. 10. The plate, 116, carries a pawl, 119, which latter is pivoted thereto at, 120, and the pawl has an upper end, 121, which projects vertically above the plate, 116, and normally projects in the path of the projections, 112, on the wall of the circular receiver. A slot, 122, is provided in the pawl so that a screw, 123, may pass freely therethrough and enter the plate, 116, and a spring, 124, presses against the pawl to yieldingly press the same so its free end, 121, will normally project in the path of the projections, 112.

From the foregoing explanation it will be seen that when the eccentric moves the plate, 116, up, the end, 121, of the pawl, 119, will project beneath one of the projections or pins, 112, and will move the receiver a distance equal to the throw of the eccentric which is the same as the distance between adjacent compartments of the receiver.

This movement results in presenting the compartments, one after another to the end of the outgoing guideway. To prevent a return of the receiver when the pawl, 119, is retracted, there is provided a second pawl, 125, on the outer side of the bar, 26, which latter is pressed by a spring, 126, so as to project beneath one of the projections, 112, and remain there while the advancing pawl, 119, is making its return stroke. It will therefore be understood that after each peg plate is pushed into a compartment of the receiver, the latter is moved to present another compartment in position to receive a plate, and this operation continues until all of the compartments are filled with peg plates whose pegs have been coated. During all of this period the fan or blower, 113, is directing a blast of air over the gelatin coatings on the pegs thereby drying and hardening the same.

The next step in the operation of the machine is to successively withdraw the peg plates from the compartments which operation takes place just prior to the movement of the compartments into alinement with the outgoing guideway. When one compartment is in register with the said guideway the next compartment containing a peg plate will have position in alinement with the inclined turnover plate, 43, which at that time has position below the discharge end of the outgoing guideway, as best seen in Figs. 12 and 13 of the drawings. The plates are therefore extracted or withdrawn from the receiver compartments by means which will now be explained, attention being directed to Figs. 2, 7, 8, 9, 11, 12 and 13 of the drawings. The vertical upright bars, 28—28, sustain a horizontal bracket bearing, 127, which carries a horizontal rock shaft, 128. This rock shaft has an arm, 129, rigidly secured thereon which depends from the shaft and whose lower end is pivotally connected with one end of a link bar, 130, and the other end of said link bar is pivotally connected to the long upright lever, 91, which actuates the feed bars for the peg plates. The outer end of rock shaft, 128, carries a rock lever, 131, which extends upwardly to a point beneath the outgoing guideway where it pivotally sustains one end of a connecting rod, 132. This connecting rod pivotally engages a block or head, 133, on a reciprocable rod, 134. This rod, 134, is sustained by suitable brackets, 135, and, 136. It will therefore be seen that when lever, 91, is moved by cam, 96, so as to swing the upper end of said lever, 91, in a direction to feed the peg plates to the circular receiver, the link, 130, will be actuated by said lever, 91, to swing rock lever, 131; connecting rod, 132, and reciprocable rod, 134, in a direction away from the circular receiver. It is this movement of reciprocable rod, 134, that is utilized to withdraw the peg plates from the receiver as will now be explained.

The reciprocable rod, 134, has position beneath the outgoing guideway and has one end projecting beyond the discharge end of said guideway. This projecting end of the rod has a downwardly-projecting pin, 137, as clearly shown in Figs. 2, 3, 11 and 12 of the drawings. This pin normally has position in a vertical plane where it will project in the path of the outer end of the peg plate that is in the next approaching compartment of the circular receiver,—the position of the pin also being such that as the peg plate is moved toward it, the pin, 137, will enter the perforation, 103, in the end of the plate just as the circular receiver is brought to a stop. At this period in the operation of the machine, the circular receiver is at rest with an empty compartment in alinement with the discharge end of the outgoing guideway; with a peg plate in the next compartment in alinement with the turnover plate, 43, and with the pin, 137, of reciprocable rod, 134, in engagement with the perforation, 103, in the end of the peg plate. At this same time the turnover frame at the opposite end of the outgoing guideway has turned over and presented a peg plate whose pegs have been freshly dipped or coated with gelatin and is in readiness to be moved from the turnover frame into the outgoing guideway,—the latter being filled with plates from one end to the other. When the machine then makes its next movement the end, 100, of rod, 95, will push the peg plate with the freshly coated pegs from the turnover frame into the outgoing guideway thereby advancing all of the peg plates then in said guideway and pushing the end plate from said guideway into the empty compartment of the circular receiver. While this is going on the rod, 134, is simultaneously moved in a direction away from the circular receiver, through the movement of rock lever, 131, and the peg plate in the compartment next below that into which a peg plate is being pushed, is withdrawn by the rod, 134, and its pin, 137, and said withdrawn peg plate is pulled by the rod, 134, into the turnover plate, 43. During the movement of a peg plate from the receiver into the turnover plate, 43, the rods, 94, and, 95, are moved in a direction toward the said circular receiver so that when the withdrawn peg plate is entirely on the turnover plate, 43, the said rods, 94, and, 95, will have made their full stroke away from the turnover frame at the coating end of the machine. At this period of the operation the feed-end of rod, 94, which feeds the peg plate through the return guideway will have moved beyond the entrance-end of the turnover plate, 43, into which a peg plate has just been withdrawn from the receiver, and immediately thereafter said turnover plate, 43, will be turned back through an arc, shown by broken lines in Fig. 13, so as to swing the withdrawn peg plate into alinement with the return guideway and at the same time turn the pegs down in a pendant position with the dried and hardened capsule coatings thereon. The peg plate last withdrawn from the receiver will then be in position to be transferred from the turnover plate, 43, into the return guideway, as will now be described.

Referring to Figs. 2, 3 and 8 of the drawings it will be seen that the end of rod, 94, is provided with a bracket, 138, having an arm, 139, which curves downwardly and laterally so as to have position in a plane where it may impinge against the rear end of the peg plate while the latter is held in the reversed turnover plate. When the rod, 94, makes its return stroke to feed a plate into position for dipping or coating, the arm, 139, will pass under the turnover plate, 43, and will push the peg plate therefrom and into the grooves, 32, of the return guideway where the capsule coatings are next to be stripped from the pegs. During this transfer of the peg plate from the turnover plate into the return guideway by the rod, 94, the same movement of the rod will cause the pawl, 102, to push the foremost peg plate in this same guideway, from which the capsules have been stripped, into that guide section, 39, of the turnover frame which at that time is in register with the front end of the return guideway and all of the plates then in said return guideway will be advanced the length of one peg plate. Immediately upon these movements being completed, the turnover plate, 43, will be swung back to a position beneath the outgoing guideway as shown in full lines in Fig. 13, of the drawing.

The next operation in the machine is that of stripping or removing the capsule parts from the pegs of the peg-plate last removed from the turnover plate, 43, such peg plate having been delivered to a stripping mechanism and to the mechanism which cleans the pegs after the capsule parts have been stripped therefrom, the two mechanisms being closely associated in the present construction of machine and will therefore be explained together, which will now be described reference being made to Figs. 2, 3, 6, 7, 8, 14, 15, 16 and 17 of the drawings.

By referring to Figs. 6, 7, 8, 12 and 14 it will be noted that the vertical bars 27—27; 28—28 and 29—29 are provided with vertical guide grooves, 140, (see Figs. 12 and 14) and that the grooves of bars 27—27, sustain a vertical guide plate, 141; the grooves of bars 28—28 sustain a vertical guide plate, 142, and a third guide plate, 143, is sustained by the bars 29—29. Each guide plate has a roller, 144, 145, and 146. The roller, 144, travels in a groove, 147, on cam, 53; roller, 145, travels in a groove, 148, in a cam, 149, and rollers, 146, travels in a groove, 150, of cam, 87, which latter also serves to operate cam-lever, 84, to actuate the turnover frame as heretofore explained. All of these cams, 53, 149, and, 87, are mounted on the main shaft, 54, and the grooves, 147, 148, and, 150 in said cams are of the same contour so that rollers, 144, 145, and, 146, will be given a like vertical movement and each vertical guide plate 141, 142, and, 143, will be moved in unison.

The upper ends of the guide plates, 141, 142, and, 143, carry a horizontal table, 151,— the table in the present instance having a length equal to the combined length of three peg plates, as shown in Fig. 14, of the drawings. As the table, 151, is carried by the guide plates, 141, 142, and, 143, it is obvious that any vertical movement given the guide plates will be imparted to the table.

By referring particularly to Figs. 14 and 15, it will be seen that the table has a stripper section or portion, 152, which is provided with a plurality of vertical perforations, 153, which extend entirely through the said portion. It will also be noted that said stripper portion, 152, has a laterally-projecting horizontal shelf, 154, which carries a horizontal bearing plate, 155. Beneath the bearing plate are two slide plates, 156, and, 157, respectively, which are sustained in brackets, 158, that depend from the bearing plate. The bottom side of slide plate, 156, is provided with a pinch plate, 159, which extends horizontally and in close proximity to the bottom side of the stripper portion, 152, of the table, and said pinch plate has a plurality of perforations, 160. The upper side of slide plate, 157, also carries a horizontal pinch plate, 161, which latter has a plurality of perforations, 162. The two perforated pinch plates, 159, and, 161, thus lie close together.

The perforations, 153, in the table and the perforations, 160 and, 162, in the two pinch plates are all of sufficient diameter to allow the pegs of a plate with the capsule parts thereon to freely pass therethrough.

An operating member comprising a lever, 163, and two eccentrics, 164, and, 165, is carried by the plate, 155, so that when said lever is swung one eccentric, 164, will move plates, 156, and, 159, in one horizontal direction while at the same time the other eccentric, 165, will move the plates, 157, and, 161, in a reverse direction.

In practice two operating levers, 163, and, 166 are employed and a rod, 167, connects the same so that the movement of one will cause a like movement to the other. Also in practice the operation of these levers is effected automatically. When the levers, 163, and, 166, are in a certain position the pinch plates will be so positioned with respect to each other and with respect to the perforations, 153, in the table that all of said perforations will be in register. The perforations, 153, in the table are circular while the perforations, 160, and, 162, in the pinch plates each have a circular portion of a diameter to readily accommodate a peg with a capsule part thereon and with an intersecting semi-circular portion, 168, to engage the capsule part and do the actual stripping, as best seen in Figs. 16 and 17 of the drawings.

By referring now to Fig. 15, it will be seen that the return guideway is so situated with respect to the stripper portion, 152, of table, 151, that a peg plate in the grooves, 32, of the guideway will have position so that the pegs thereon will register with the perforations, 153, and, 160, and, 162. When therefore the table is elevated by guide plates, 141, 142, and, 143, the pegs with the capsule parts thereon will enter said perforations. The lever, 163, is then actuated so as to shift the pinch plates, 159, and, 161, thereby moving one pinch plate in one direction and the other in a reverse direction and causing said pinch plate to engage the capsule parts that are on the pendant pegs so that upon the lowering of the table and pinch plates from the pegs, as shown in Fig. 18, the capsule parts, 169, will be stripped from the pegs. After the capsule parts have been stripped from the pegs the table, 151, is lowered and when another peg plate is pushed into the return guideway from the turnover plate, 43, the plate whose pegs have just been stripped of capsule parts will be advanced along the return trackway to a point where the pegs are to be cleaned. This cleaning is effected by the upward movement of the table beyond the stripping mechanism through the medium of perforations, 170, in the table and other perforations, 171, in a pad of cleaning material, 172. The two sets of perforations receiving the pegs when the table makes its upward stroke.

In the same manner may the greasing of the pegs after cleaning be accomplished, if greasing is employed. To effect a greasing of the pegs a pad, 173, is located on the table, 151, beyond the cleaning pad and said pad, 173, also has perforations which register with perforations in the table so the pegs may be pushed into the pad perforations and gather sufficient oil to lubricate the same.

To drive the machine any suitable power may be applied to main shaft, 54, but in the present instance said shaft is provided with a gear, 174, which meshes with and is driven by a pinion, 175, on a counter shaft, 176, and said counter shaft carries a worm gear, 177, which is driven by a worm, 178, on a power driven shaft, 179.

In practice it is preferred that some means be provided to effect a skimming of the surface of the gelatin in the container, 72, before a set of pegs are dipped. To do this a skimmer paddle, 180, is provided, and a rod 181, connects said paddle with the lever, 91, so that each time the lever is moved in a direction away from the tank it will draw the skimmer across the container.

Having thus described my invention what I claim and desire to secure by Letters Patent is:—

1. A capsule machine having a coating station, a rotary receiver having an endless series of radial plate compartments; a stripping mechanism; a plurality of peg plates having mold pegs thereon; means for moving the plates from the coating station to and placing them in the radial compartments of the rotary receiver and means for moving the peg plates from the compartments of the rotary receiver to the stripping station.

2. A capsule machine having a coating station, a rotary receiver having an endless series of radial plate compartments; a stripping mechanism; a plurality of peg plates having mold pegs thereon; means for moving the plates from the coating station to and placing them one after another in the successive compartments of the rotary receiver; means for giving the rotary receiver an intermittent rotation to present the successive compartments one after another to receiving position and means for moving the peg plates one at a time to the stripping mechanism from the successive compartments of the rotary receiver.

3. In a capsule machine the combination with means to contain a fluid gelatin of an outgoing guideway leading from the container; a return guideway leading back to the said container; a plurality of plates having mold pegs thereon; a circular receiver having an endless series of plate-receiving compartments opening at its circumference and interposed between the outgoing and return guideways for receiving and storing a plurality of plates; means for moving the plates one at a time from the compartments of the receiver to the return guideway and means for moving the plates through the return guideway back to the container.

4. In a capsule machine the combination with two guide-ways, of a turnover device at one end of the two guideways said device having one guide to register with one of said two guideways and another guide to register with the other of said two guideways; a container to hold a coating fluid adjacent to said turnover device; a plurality of plates having mold pegs thereon; means for moving one plate at a time into one guide of the turnover device; means for bringing the pegs of the plate in said turnover guide into coating relation with the container; means for moving the turnover to shift the guide with the coated pegs and its plate into alinement with one of the guideways and to present the other empty guide to an alined portion with the other guideway and means for moving said plate and pegs from the shifted guide into the guideway with which it was last registered.

5. In a capsule machine the combination with an outgoing guideway, of a return guideway; a turnover device at one end of said two guideways having two guide devices,—one to register with one of said guideways and the other to simultaneously register with the other of said guideways; another turnover device at the opposite end of said return guideway; a container for a fluid coating at one end of the two guideways; a plurality of peg plates having mold pegs thereon and means along the return guideway and between the two turnover devices for stripping capsule parts from the pegs of said plates.

6. In a capsule machine the combination with two guideways side by side, of a turnover device at one end of the two guideways said device having two guide sections one of which registers with one guideway while the other is in register with the other of said guideways; means for actuating said turnover device to reverse the positions of the guide sections with respect to the two guideways; a plurality of peg plates each having mold pegs thereon; a single turnover device at the opposite end of the guideways; a container for a fluid coating adjacent to the two guide-section turnovers and means for moving the peg plates from one guideway into one section of the first named turnover and from the turnover into the other guideway.

7. In a capsule machine the combination with two guideways side-by-side, of a turnover device at one end of said two guideways; a container for a fluid coating adjacent to said turnover device; a plurality of peg plates having mold pegs thereon; means for moving the peg plates through one guideway from the turnover; an endless receiver to receive the peg plates from one guideway and means for transferring the peg plates from the endless receiver to the other guideway.

8. In a capsule machine the combination with two guideways side-by-side, of a turnover device at one end of said two guideways; a container for a fluid coating adjacent to said turnover device; a plurality of peg plates having mold pegs thereon; means for moving the peg plates through one guideway from the turnover; an endless receiver to receive the peg plates from one guideway; a turnover device to receive the plates from the endless receiver and present them to the other guideway and means for transferring said plates from the latter turnover to the other guideway.

9. In a capsule machine the combination with two guideways side-by-side, of a turnover device at one end of said two guideways; a container for a fluid coating adjacent to said turnover device; a plurality of peg plates having mold pegs thereon; means for moving the peg plates through one guideway from the turnover; an endless receiver to receive the peg plates from one guideway; a turnover device to receive the peg plates from the receiver and present them to the other guideway and a stripping mechanism along the latter guideway.

10. In a capsule machine the combination with two guideways side-by-side, of a turnover device at one end of said two guideways; a container for a fluid coating adjacent to said turnover device; a plurality of peg plates having mold pegs thereon; means for moving the peg plates through one guideway from the turnover; an endless receiver to receive the peg plates from one guideway; a turnover device to receive the peg plates from the receiver and present them to the other guideway; means for advancing the plates from the latter turnover device; a stripping mechanism along said latter guideway and means also along said latter guideway to clean the pegs of the plates.

11. In a capsule machine the combination with two guideways side-by-side, of a container for a fluid coating at one end of said two guideways; a turnover device adjacent to the said container and movable from one guideway to the other; a circular receiver beyond the other ends of said guideways; a plurality of peg plates each having mold pegs thereon; means for moving the peg plates from one guideway into the circular receiver; means for intermittently moving the receiver; a turnover adjacent to the receiver to receive peg plates from the latter and deliver them to the other guideway and means for stripping the pegs on the plates while the latter are in the last-named guideway.

12. In a capsule machine the combination with a container for a fluid coating, of an outgoing guideway; a return guideway said guideways having one end in proximity to the container; a plurality of peg plates each having mold pegs thereon; a turnover device having two guide sections one of which has position in alinement with the return guideway while the other is in alinement with the outgoing guideway; a circular receiver at the end of the outgoing guideway to receive the peg plates from said guideway; means for intermittently moving said receiver; a turnover device interposed between the circular receiver and the return guideway; means for withdrawing the plates from the circular receiver and placing them in the latter turnover device; means for actuating the turnover device to present the plates in alinement with the return guideway and means adjacent to the return guideway for stripping the capsule parts from the pegs.

13. In a capsule machine the combination with means to contain a fluid coating, of an outgoing guideway; a return guideway,— one of said guideways being in a horizontal plane below the other and in a vertical plane to one side of said other guideway; a turnover shaft extending horizontally between the two guideways; a turnover device carried by said shaft and said turnover device having two guide sections one of which alines with the upper outgoing guideway while the other is in alinement with the lower return guideway; means for rotating the turnover shaft to reverse the positions of the two guide sections with respect to the upper and lower guideways; a plurality of peg plates each having mold pegs thereon; means for moving peg plates from one guideway into one turnover section and means for moving the peg plates from the turnover section into the other guideway.

14. In a capsule machine the combination with two guideways of means at one end of the guideways for holding a fluid coating; a plurality of peg plates each having mold pegs thereon; an endless receiver at the other end of the guideways to receive the plates from one of said guideways; a pivoted turnover plate adjacent to the receiver; reciprocating means for extracting peg plates one at a time from the receiver and depositing them in the turnover plate; means for swinging the turnover plate to move the extracted plate into alinement with the other guideway and means for moving said peg plate from said turnover plate into said latter guideway.

15. In a capsule machine the combination with coating means, of a plurality of peg plates each having mold pegs thereon; means for moving the peg plates away from the coating means; a circular receiver to receive the peg plates after the pegs have been coated,—said receiver having an annular series of compartments each to receive a peg plate; means to intermittently move the circular receiver and means for returning the peg plates to the coating means from the circular receiver.

16. In a capsule machine the combination with coating means, of a plurality of peg plates each having mold pegs thereon; means for moving the peg plates away from the coating means; a circular receiver to receive the peg plates after the pegs have been coated,—said receiver having an annular series of compartments each to receive a peg plate; means for directing an air current through the compartments of the receiver; means for moving the receiver, and means for returning the plates to the coating means.

17. In a capsule machine the combination with coating means, of a receiver; a plurality of peg plates each having mold pegs thereon and each plate having a perforation at one end; means for moving the peg plates into the receiver after the pegs have been coated and means for entering the perforations in the peg plates for extracting the latter from the receiver.

In testimony whereof, I have signed my name to this specification in the presence of two subscribing witnesses.

WILLIAM V. WINCHESTER,
*Administrator of the estate of Benjamin T. Winchester.*

Witnesses:
CHARLES B. MANN, Jr.,
G. FERD. VOGT.